(12) United States Patent
Bricard et al.

(10) Patent No.: US 8,701,708 B2
(45) Date of Patent: Apr. 22, 2014

(54) REDUNDANT OXYGEN SUPPLY FOR AN AIRCRAFT

(75) Inventors: Patrick Bricard, Hamburg (DE); Emin Costan, Apensen (DE); Walter Deutscher, Dassendorf (DE); Thomas Vogt, Hamburg (DE); Markus Wirth, Hamburg (DE)

(73) Assignee: Airbus Operations GmbH (DE)

( * ) Notice: Subject to any disclaimer, the term of this patent is extended or adjusted under 35 U.S.C. 154(b) by 538 days.

(21) Appl. No.: 12/595,320

(22) PCT Filed: Apr. 9, 2008

(86) PCT No.: PCT/EP2008/054302
§ 371 (c)(1),
(2), (4) Date: Oct. 9, 2009

(87) PCT Pub. No.: WO2008/125572
PCT Pub. Date: Oct. 23, 2008

(65) Prior Publication Data
US 2010/0051113 A1 Mar. 4, 2010

Related U.S. Application Data

(60) Provisional application No. 60/923,479, filed on Apr. 13, 2007.

(30) Foreign Application Priority Data

Apr. 13, 2007 (DE) .................... 10 2007 017 601

(51) Int. Cl.
*A61B 7/02* (2006.01)
*F16K 17/22* (2006.01)

(52) U.S. Cl.
USPC .... 137/597; 137/861; 128/204.18; 244/118.5

(58) Field of Classification Search
USPC .......... 137/460, 459, 861, 512.3, 899.2, 597, 137/498; 128/200.24, 204.18, 204.21, 128/204.29, 205.25, 205.24; 244/118.5
See application file for complete search history.

(56) References Cited

U.S. PATENT DOCUMENTS

| | | | |
|---|---|---|---|
| 2,306,382 A | 12/1942 | Fink et al. | |
| 4,518,955 A * | 5/1985 | Meyer | 340/605 |
| 4,651,728 A | 3/1987 | Gupta et al. | |
| 6,119,720 A * | 9/2000 | Isaacson et al. | 137/459 |
| 2003/0196696 A1 | 10/2003 | Meckes et al. | |
| 2004/0226621 A1* | 11/2004 | Phillips et al. | 137/883 |

FOREIGN PATENT DOCUMENTS

| | | | |
|---|---|---|---|
| DE | 10217500 A1 | 11/2003 | |
| EP | 1512433 A2 | 3/2005 | |
| WO | WO2005/063577 A1 * | 7/2005 | B64D 13/08 |

* cited by examiner

*Primary Examiner* — Stephen M Hepperle
*Assistant Examiner* — Jonathan Waddy
(74) *Attorney, Agent, or Firm* — Lerner, David, Littenberg, Krumholz & Mentlik, LLP (57) ABSTRACT

A redundant gas supply or oxygen supply for an aircraft comprising two main lines and a group supply line that is connected to one consumer or to a multitude of consumers. In each case a connecting line connects the respective one main line to the group supply line. Flow limiters and nonreturn valves can be provided in the connecting lines.

13 Claims, 5 Drawing Sheets

REDUNDANT OXYGEN SUPPLY FOR AN AIRCRAFT

CROSS-REFERENCE TO RELATED APPLICATIONS

This application is a national phase entry under 35 U.S.C. §371 of International Application No. PCT/EP2008/054302, filed Apr. 9, 2008, published in English, which claims the benefit of the filing date of German Patent Application No. 10 2007 017 601.7 filed Apr. 13, 2007 and of U.S. Provisional Patent Application No. 60/923,479 filed Apr. 13, 2007, the disclosures of which applications are hereby incorporated herein by reference.

FIELD OF THE INVENTION

The present invention relates to a device or a system for supplying gas, in particular for supplying oxygen, to an aircraft, and in particular the invention relates to a redundant gas supply system or oxygen supply system for an aircraft for use in regions where special redundancy is required due to increased failure probability.

BACKGROUND TO THE INVENTION

Aircraft, and in particular passenger aircraft, are equipped with oxygen supply systems, for example in order to supply passengers with air for breathing or with oxygen in the case of a loss of cabin pressure. In some regions of an aircraft the probability of damage occurring is higher. This applies, for example, to a region of an aircraft where in the case of a malfunction it is possible for parts of power plants to penetrate the aircraft, thus damaging lines, in particular oxygen supply lines. In order to be able to ensure the supply to an adequate number of passengers in such a case, for example two supply lines are provided, wherein each can alternately supply oxygen to every second seat row. In this arrangement, for example, one of these main pipelines can be arranged in the ceiling region and a second one in the subfloor region. By way of ascending lines it is possible, for example, in each case to connect three or four seat rows alternately to the upper or to the lower line. If one of the lines incurs damage, said line can be closed off by way of corresponding valves so as to prevent loss of the entire quantity of oxygen and thus of the entire system. In this case it is provided for the passengers that are affected by the failure of the oxygen supply to be supplied as well by way of the respective seat row in front of or behind the affected seat row, because these seat rows are supplied with oxygen by way of another main pipeline. However, this results in passengers either having to use an oxygen mask alternately in a shared arrangement, or for a corresponding additional number of oxygen masks having to be provided in each row. Furthermore, in such a case of malfunction a relatively long section of the main pipeline has to be closed so that a relatively large number of seats can no longer be supplied.

U.S. Pat. No. 4,651,728 describes a breathing system for high altitude aircraft in which a breathing mask is connected to a pressure controller. The pressure controller is connected to a selector valve, which in turn is connected to an oxygen generating system and to a standby oxygen supply. The selector valve selects the breathing gas from one of these two sources. The oxygen supply system or breathing system described in U.S. Pat. No. 4,651,728 is designed for supplying breathing gas to a pilot.

PRESENTATION OF THE INVENTION

It can be regarded as an object of the present invention to improve the redundancy of the oxygen supply, by means of an oxygen supply system or gas supply system for passengers in an aircraft, when compared to that of the state of the art.

The object of the present invention is solved by the subject matter of the independent claims, wherein advantageous embodiments are incorporated in the dependent claims.

According to an exemplary embodiment of the invention, a gas supply system for an aircraft is provided, comprising a first main line, a second main line, a group supply line that is connected to one consumer or to a multitude of consumers, a first connecting line that connects the first main line to the group supply line, and a second connecting line that connects the second main line to the group supply line.

In this way a group supply line that can supply a multitude of consumers with gas or oxygen is not only supplied with oxygen or gas by one main line but by two main lines. Such an arrangement increases the redundancy of a gas- or oxygen supply system for an aircraft. In this way it is possible, for example in the case of failure due to a malfunction, for one of the two main lines to continue to supply oxygen to the group supply line, without having to actively establish an alternative oxygen supply for the passengers affected. The first and the second connecting lines can also be designed so as to be very short, for example such that there is just enough space to be able to provide shut-off devices or valves.

According to an exemplary embodiment of the invention, between at least one main line and the group supply line a flow monitoring device is provided which is designed to limit the flow when a threshold value is exceeded.

With such a flow monitoring device it is possible, for example in the case of damage sustained by the group supply line, to detect an increase in the gas flow as a result of a serious leakage so that when the flow or the flow quantity exceeds a particular threshold value the flow into the branch of the group supply line can be limited in order to stop excessive and fast oxygen loss in the entire system. In the simplest case a flow monitoring device can be a flow limiter which in the case of a through-flow that exceeds the threshold value is closed off by the force of the flow. However, it is also possible to provide controlled actuation of flow limitation.

According to an exemplary embodiment of the invention, the threshold value exceeds a maximum nominal consumption of all consumers that are connected to the group supply line, and the flow is essentially limited to zero when this threshold value is exceeded.

For example, individual oxygen masks or groups of oxygen masks, depending on the configuration of the system, can be regarded as consumers. By setting the threshold value so that it exceeds the maximum nominal consumption of all the consumers it is possible to ensure that even in the case of the design maximum all the consumers can still adequately be supplied with oxygen without the threshold value being exceeded, i.e. without the flow monitoring device triggering a limitation of the flow. If a flow is detected that exceeds the maximum nominal consumption of all the consumers, then this indicates with very great probability that there is a defect or a leakage in the system. This can then be used to provide the trigger to limit the gas- or oxygen flow into the affected group supply line to a very small flow, in particular to zero. In other words, in such a case the group supply line can be decoupled from the supply. If needed, the affected passengers can then be supplied with oxygen by way of the respective front and rear seat rows. However, only a single group supply line is affected by such a malfunction, rather than every second seat row as is the case in the state of the art. In this case it is possible to ensure the supply to the remaining group supply lines even when a group supply line has been destroyed. One group supply line can, for example, be used for the supply of an entire seat row. As an alternative, the supply of two or several seat rows by one group supply line is also imaginable, in particular in the case of aircraft comprising several passenger cabin elements, so that the supply of one seat row on an upper level and one seat row on a lower level by a single group supply line suggests itself. Of course, it is also possible to supply a block of seat groups by one group supply line, for example three or four seat rows of the seats near the windows, or several seat rows of the middle seats between two aisles.

According to an exemplary embodiment of the invention, the flow monitoring device delimits the at least one main line from the connecting line connected to it.

In this way, to be prepared for a situation where damage is sustained, the connecting line is functionally associated with the group supply line so that even if the connecting line is damaged the flow monitoring device can delimit the gas flow or oxygen flow if the threshold value is exceeded.

According to an exemplary embodiment of the invention, between at least one main line and the group supply line a nonreturn valve device is provided that is designed to permit a gas supply flow essentially only in one direction from the at least one main supply line to the group supply line.

In the case of one of the main lines sustaining damage, such a nonreturn valve device can prevent the gas or oxygen fed from the other main line into the group supply line from being lost as a result of being coupled to the damaged main line. In other words, the oxygen or the gas can only flow from the main line to the group supply line; it cannot flow from the group supply line back into one of the main lines, in particular it cannot flow into a damaged main line.

According to an exemplary embodiment of the invention, the nonreturn valve device delimits at least one connecting line from the group supply line.

In this way, for a situation where damage is sustained by a main line, the connecting line is functionally associated with the main line so that even if the connecting line is damaged no gas can flow from the group supply line into the connecting line that is connected to the damaged main line. For example, as a result of combining the flow monitoring device (as a delimitation between the main line and the connecting line connected to it) with the nonreturn valve device (as a delimitation between the supply line and the group supply line in the case of the connecting line sustaining damage) the supply to all the consumers can be ensured unchanged, because in this case both the nonreturn valve device prevents oxygen or gas from flowing from the group supply line, and the flow monitoring device prevents oxygen from subsequently flowing from the other main line into the damaged connecting line. In this way, in particular in the case of a combination of the flow monitoring device with the nonreturn valve device, such a combination ensures redundant supply of oxygen without there being a major loss of oxygen as a result of the redundant main line.

According to an exemplary embodiment of the invention, between the group supply line and a consumer a flow monitoring device is provided that is designed to limit the flow when a threshold value is exceeded, wherein the threshold value exceeds the value of the maximum nominal consumption of the consumer, and the flow is limited essentially to zero when this threshold value is exceeded.

Such a flow monitoring device can prevent oxygen loss or gas loss in the group supply line when a leakage occurs in the branch of the consumer, for example if an oxygen mask is pulled off the group supply line. This nominal consumption can also be deposited as a breathing pattern. If a hose is pulled off, as a rule the flow is continuous, while in the case of breathing, the consumption of oxygen is cyclic. If there is a significant deviation from a breathing pattern, the oxygen supply can be stopped.

According to an exemplary embodiment, the flow monitoring device comprises a spring valve, wherein the threshold value is predeterminable by dimensioning the spring.

With a spring valve it is possible to achieve flow monitoring without having to use sensors or actuators. This is advantageous in particular where there is a danger of a complete loss of electric power, which would then also lead to a failure of a measuring- or control device.

According to an exemplary embodiment of the invention, a flow monitoring device and/or a nonreturn valve device comprise/comprises a valve, a pressure ratio determination device for determining the pressure ratio of a pressure upstream and downstream of the valve, and a valve control device, wherein the valve control device is designed to control the valve based on the pressure ratio determined.

In this arrangement the pressure ratio can be a pressure differential or a pressure quotient of pressures upstream and downstream of the valve. However, a pressure ratio can also refer to any other connection between the pressure upstream of the valve and the pressure downstream of the valve, as long as this pressure ratio can be used as a basis for controlling the valve. In this way it is possible, for example, to dynamically change the sensitivities or the threshold values of the flow monitoring device or of the nonreturn valve device, depending on requirements. For example, the threshold value can be individually set depending on the number of occupied seats so that when the threshold value is set the maximum nominal likely consumption by the consumers in the occupied seats is taken into account. Furthermore, it is also possible to react to external events when these are registered and provided to the valve control device.

According to an exemplary embodiment of the invention, a central monitoring device is provided which is designed to actuate existing valves on the basis of valve positions and/or pressures in the gas supply system.

Valve control can, for example, also be effected centrally so that the pressure ratios, determined by the pressure ratio determination device, of various flow monitoring devices or nonreturn valve devices are transmitted to a central control, which then coordinates and controls the actuation of the corresponding valves. The information that is thus available by way of a multitude of monitoring positions also makes it possible to evaluate and assess cases of malfunction, and in certain circumstances may make it possible for conclusions to be drawn as to the likely cause, so that countermeasures can be taken. With such a central monitoring device it is possible to coordinate control of the valves and thus to take into account in detail the state of the gas supply system, provided the acquisition devices provide information relating to the individual sections of the gas supply system. In this way it is not only possible to react to malfunctions, but also to specified values, for example to the occupation of seats in an aircraft.

According to an exemplary embodiment of the invention, the gas supply system is an oxygen supply system.

According to an exemplary embodiment of the invention, the consumer is a gas- or oxygen mask or a group of gas- or oxygen masks for passengers.

According to an exemplary embodiment of the invention, an aircraft with a gas supply system according to the invention is provided.

According to an exemplary embodiment of the invention, in the aircraft the first main supply line is arranged above a passenger cabin region and the second main supply line is arranged below a passenger cabin region.

In this way the two main supply lines can be locally separated from each other, which reduces the failure probability, for example as a result of turbine debris, in the case of a malfunction. In this arrangement, for example, an aircraft comprising passenger cabin regions on several levels can comprise one main supply line in the ceiling region of the upper passenger cabin, and one main supply line in the ceiling region of the lower passenger cabin region. Likewise, an arrangement is imaginable in which a main supply line is provided in the ceiling region of the upper passenger cabin region and another main supply line in the floor region of the lower passenger cabin region. Of course, it is also possible to provide more than two main supply lines, for example in an aircraft comprising several passenger cabin levels. For example, a first main supply line can be provided in the ceiling region of the upper passenger cabin region, a second main line in the ceiling region of the lower passenger cabin region, and a third main supply line in the floor region or below the lower passenger cabin region.

According to an exemplary embodiment of the invention, the gas supply system according to the invention is arranged in a region of the aircraft which is designated a region into which, in the case of a malfunction, parts that have become detached from power plants can penetrate the aircraft.

In this way a redundant gas- or oxygen supply is provided in particular in the endangered regions.

It should be noted that the embodiments of the invention that are described below apply equally to the gas supply system and to the aircraft comprising a gas supply system according to the invention.

Individual features can of course also be combined, wherein in some cases advantageous effects may be obtained that go beyond the sum of individual effects.

These and other aspects of the present invention are explained and illustrated by the exemplary embodiments described below.

BRIEF DESCRIPTION OF THE DRAWINGS

Below, exemplary embodiments are described with reference to the following drawings.

DETAILED DESCRIPTION OF EXEMPLARY EMBODIMENTS

Figure 1:
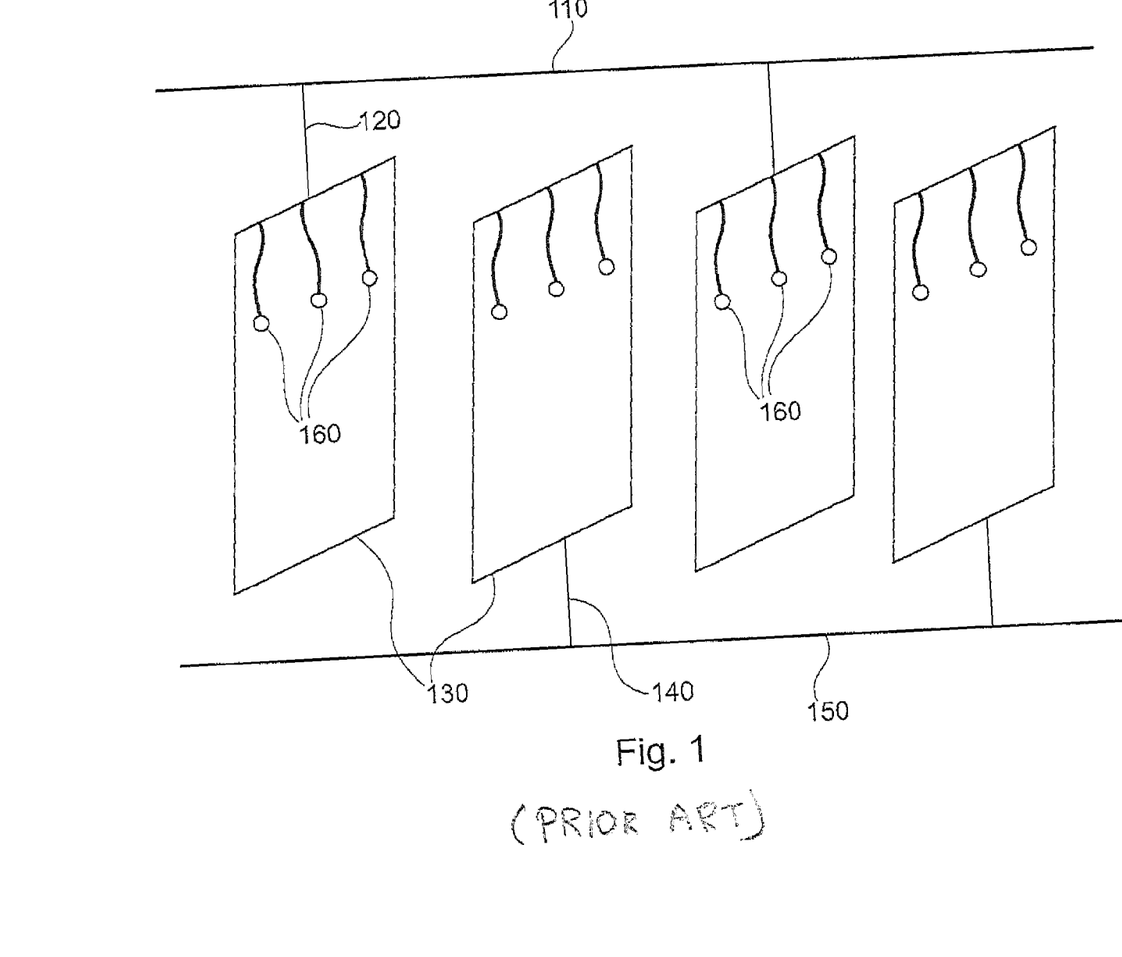
FIG. 1 shows an arrangement of a gas supply system from the state of the art.

FIG. 1 shows a gas supply system according to the state of the art. The gas supply system shown in FIG. 1 comprises a first supply line 110 and a second supply line 150. In this arrangement, group supply lines 130 are alternately supplied by way of the first main supply line 110 and the second main supply line 150. In this arrangement there is a connecting line 120 or 140 between the main supply line and the corresponding group supply line. By the group supply line 130, various consumers 160 are then supplied with gas or oxygen. In the case of failure of one of the two main supply lines 110, 150, such an arrangement leads to a loss of supply to half the group supply lines in the corresponding section of the aircraft, a situation which in reality leads to a failure to supply approximately half the passengers in the affected region of an aircraft. Such a supply failure can only be overcome with extreme effort, for example in that those passengers that are supplied by each second failed group supply line 130 connect themselves to the group supply line 130 that is situated in between and that is still being supplied, for example in that two passengers share one oxygen mask which they share alternately. In stress situations in an aircraft, which situations occur in particular in exceptional circumstances in which the supply of oxygen becomes necessary in the first place, failure of approximately half of the oxygen supply may pose an increased potential for panic in an aircraft so that such a state is to be avoided if at all possible.

Figure 2:
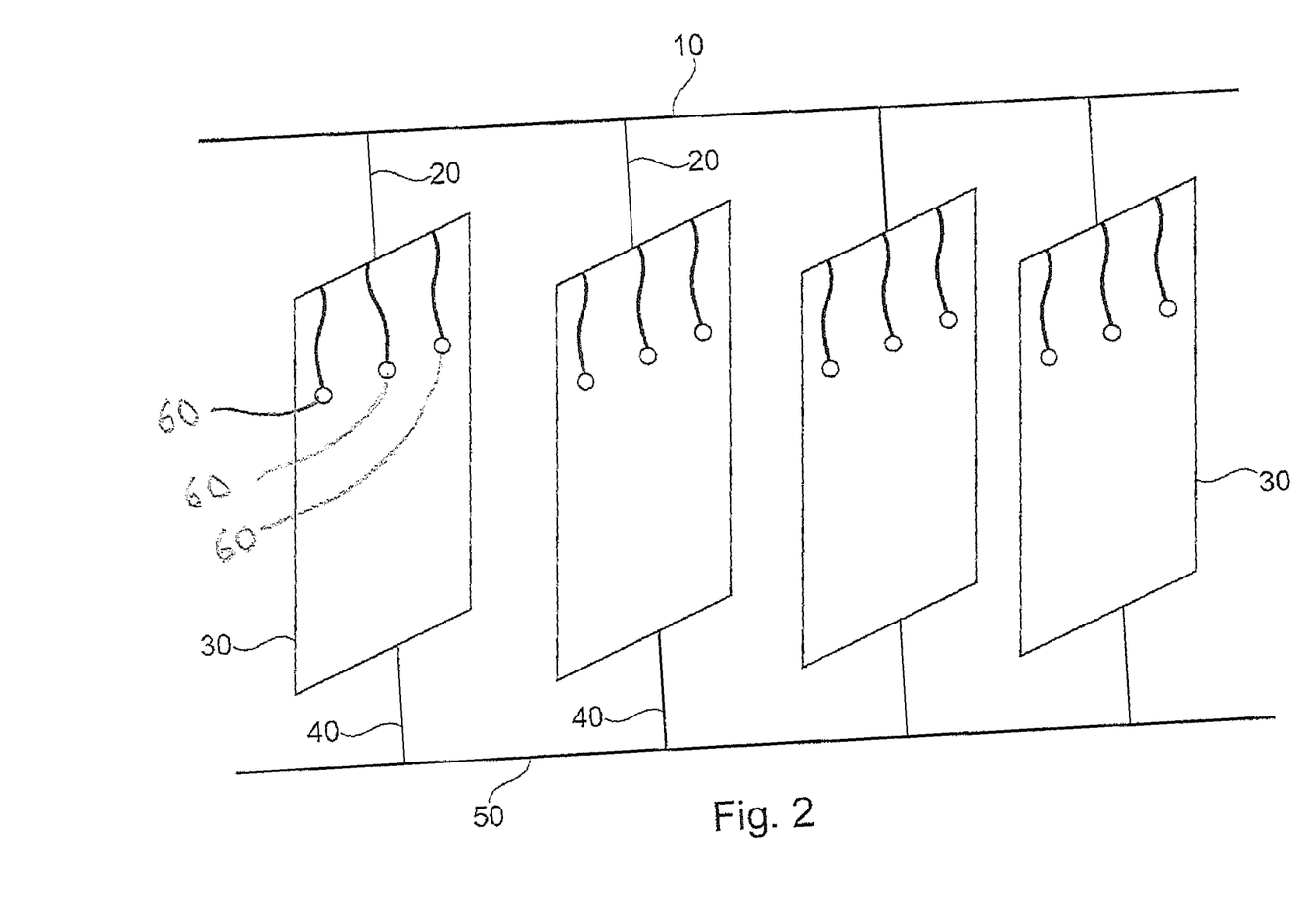
FIG. 2 shows a gas supply system according to an exemplary embodiment of the invention.

FIG. 2 shows a gas supply or oxygen supply according to an exemplary embodiment of the invention, which gas supply or oxygen supply is designed so as to be redundant in that a group supply line 30 is supplied with oxygen or gas both by way of a first main supply line 10 and a second main supply line 50. In this arrangement, feed-in to the group supply line takes place by way of a first connecting line 20 or a second connecting line 40. The connecting lines can also be kept very short; they may be reduced to a direct transition between the main supply line and the group supply line. Shut-off devices can be provided in the connecting line. By coupling the group supply line to two or more main supply lines, each group supply line 30 can be supplied with oxygen, even if one of the two main supply lines 10, 50 were to fail due to an abnormal occurrence. In the embodiment shown, by way of each group supply line 30 a multitude of consumers 60 are supplied with gas or oxygen. In this arrangement each consumer can be an individual oxygen mask or gas mask, or a group of oxygen masks or gas masks. For the sake of clarity, no valve devices are shown in the embodiment shown in FIG. 2, but such valve devices can be provided in order to make possible the uncontrolled inflow or outflow of gas or oxygen to various regions of the gas- or oxygen supply system.

Figure 3:
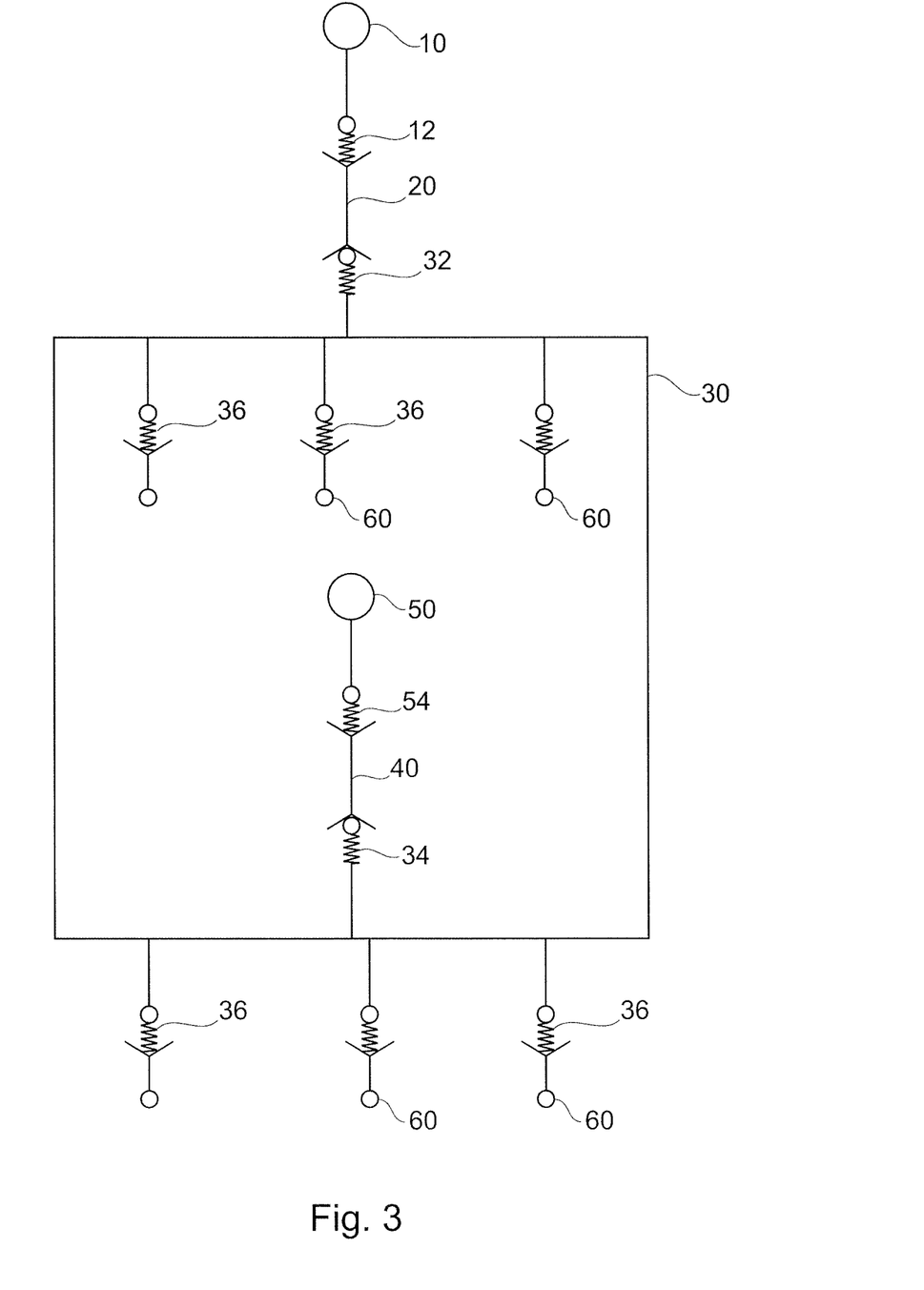
FIG. 3 shows a gas supply system according to a further exemplary embodiment of the invention.

FIG. 3 shows an illustration of a gas- or oxygen supply system according to an exemplary embodiment of the invention, which embodiment, as an example, shows a group supply line 30 that is supplied with gas or oxygen by way of two main supply lines 10, 50. In this arrangement a flow monitoring device 12 is provided between the main supply line 10 and the group supply line 30, which flow monitoring device 12 can monitor the gas flow or oxygen flow from the main supply line 10 to the group supply line 30. Said flow monitoring device is predominantly designed to detect an increased gas flow or oxygen flow, for example in the case of a leakage downstream of the flow monitoring device 12, which increased flow is put down to a leakage, so that in this case the flow monitoring device can limit the gas flow or oxygen flow between the main supply line 10 and the group supply line 30. In this arrangement the threshold value above which the flow limit is triggered is to be designed such that a flow that corresponds to the maximum nominal supply quantity necessary to supply the consumers 50 does not trigger flow limiting by the flow monitoring device 12. Only if a flow occurs that exceeds the sum of the nominal consumption quantity of the consumers 60 would this indicate with considerable probability that a leakage has occurred, so that in this case flow limiting by the flow monitoring device can take place. In this arrangement the flow monitoring device can delimit the main supply line from a connecting line 20 that is connected to the main supply line 10 so that even if there is a leakage in the connecting line 20 the flow monitoring device 12 responds. Furthermore, between the main supply line 10 and the group supply line 30 a nonreturn valve device 32 can be provided which prevents gas or oxygen flowing from the group supply line back into the branch of the main supply line 10. This can be expected in particular in the case of a leakage in a main supply line 10 so that the pressure in this main supply line 10 drops such that the pressure in the main supply line 10 is below the pressure in the group supply line 30. In this case a situation must be prevented in which, by way of the faulty main supply line 10, oxygen of the group supply line 30 is lost, which oxygen is actually required to supply passengers. In this arrangement the nonreturn valve device 32 can delimit the group supply line 30 from the connecting line 20, so that even in the case of a leakage in the connecting line 20 any return flow of a gas flow or oxygen flow from the group supply line 30 can be prevented.

By combining the flow monitoring device and the nonreturn valve device, in the case of a leakage in the connecting line 20 it is thus possible, for example, to prevent oxygen or gas from subsequently flowing from the main supply line 10, namely by the flow monitoring device 12, while a subsequent flow of gas or oxygen from the group supply line 30 can also be prevented, namely by the nonreturn valve 32. In order to ensure these two functions, in this arrangement the nonreturn valve device should be situated downstream—relative to the normal case—of the flow monitoring device.

The descriptions provided in relation to the flow monitoring device 12, to the nonreturn valve device 32, to the main line 10 and to the connecting line 20 apply analogously to the second main supply line 50, to the connecting line 40, to the flow monitoring device 54, and to the nonreturn valve 34, and to their connection and function in relation to the group supply line 30.

Between the consumers 60 and the group supply line 30 it is also possible to provide a flow monitoring device 36 that prevents gas or oxygen escaping from the group supply line 30, for example in the case of a malfunction or leakage of the consumer 60. This can, for example, be the case when the hose of an oxygen mask or gas mask has been pulled off. In this case the corresponding branch is closed by the flow monitoring device 36, so that no unnecessary loss of oxygen or gas from the group supply line 30 occurs. In this arrangement, dimensioning the flow monitoring device is, for example, based on the expected maximum nominal consumption of a respective consumer 60. However, it is also possible, for example, for a breathing pattern to be deposited so that if there is a deviation from this breathing pattern a leakage can be suspected. In this arrangement the breathing pattern should, however, be set such that every imaginable human breathing pattern is covered. However, if a permanent reduction in oxygen is registered, i.e. if no breathing-out pause is detectable, then a leakage can also be assumed. The above is, however, based on the premise that a reduction and thus a breathing pattern is acquirable, for example by a pressure reducer or an acquisition sensor responding. By permanent monitoring of the flow monitoring devices 12, 54, 36 between the group supply line 30 and the consumer 60, or between the main supply line 10, 50 and the group supply line 30, even in the case of a repaired leakage, the previously shut-off region can be connected again, for example when a hose that was pulled off a sleeve has been put back into place again.

The two main supply lines 10, 50 can be arranged such that they cannot be damaged at the same time by parts from a power plant. In particular, this can be achieved in that they are not arranged one behind the other when seen from one power plant or several power plants, but instead in that they are arranged so as to differ by a certain angle. This consideration should take into account all the power plants in question.

Figure 4:
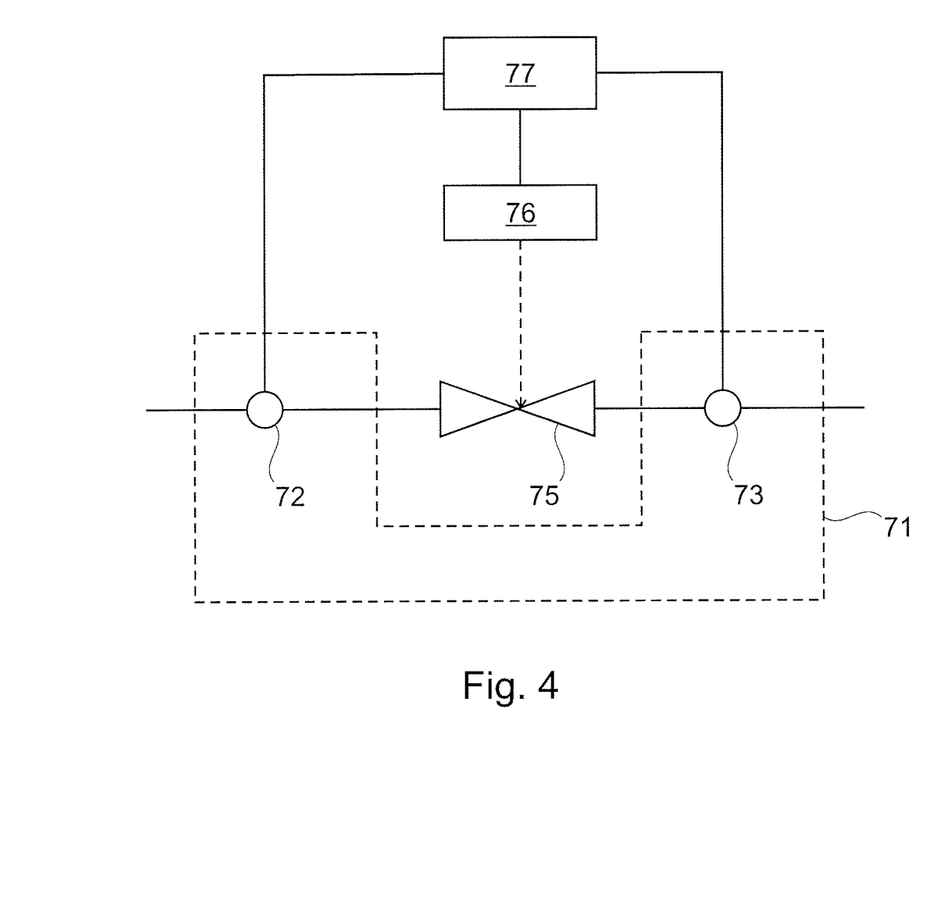
FIG. 4 shows a flow monitoring device of a gas supply system according to an exemplary embodiment of the invention.

FIG. 4 shows a diagrammatic arrangement of a flow monitoring device that in the embodiment shown comprises a valve 75 that can be activated by way of an actuator or an activation device 76. Furthermore, a pressure ratio determination device 71 is provided which can determine the pressure ratios both upstream and downstream of the valve 75. This can, for example, take place by pressure sensors of whatever type. In this arrangement either mechanical feedback by way of a spring, or electrical feedback by way of signals is possible. Using such pressure determination, for example by sensors 72, 73, corresponding information can be provided to a valve control device 77, on the basis of which the valve can be actuated by way of an activation device. In this arrangement either mechanical feedback by way of a spring or electrical feedback by way of signals is possible. In this arrangement it is not mandatory for the valve control device 77 to be arranged near the valve; instead, for example, it can also be provided in the form of a central control for a multitude of valves. From the measuring results of the sensors 72, 73, for example a pressure difference or a pressure ratio can be determined, which is then compared to a corresponding threshold value so that in this way operation of the valve is possible. The stated arrangement that comprises a pressure acquisition device 72, 73, a valve control device 77, an activation device 76 and a valve 75 can, for example, already be achieved by a simple spring valve arrangement, except that in this case the threshold value cannot be dynamically adjusted. Such a mechanical solution is advantageous in particular in the case of a complete loss of electrical power in an aircraft. However, this solution can also be expanded by a certain logic intelligence so that dynamic changes or specified values can also be taken into account, for example cabin occupation, seat occupation or other specified values. It should be mentioned that a systematic design as shown in FIG. 4 can be used both for the flow monitoring device and for the nonreturn valve device, wherein, however, in the case of the nonreturn valve only the flow-back of a gas or of oxygen is to be prevented, while in the case of flow monitoring a threshold value of a particular size can be specified.

It should be mentioned that apart from simple mechanical valves, pneumatic valves or electric valves can be used, which in turn can be actuated pneumatically or electrically.

Figure 5:
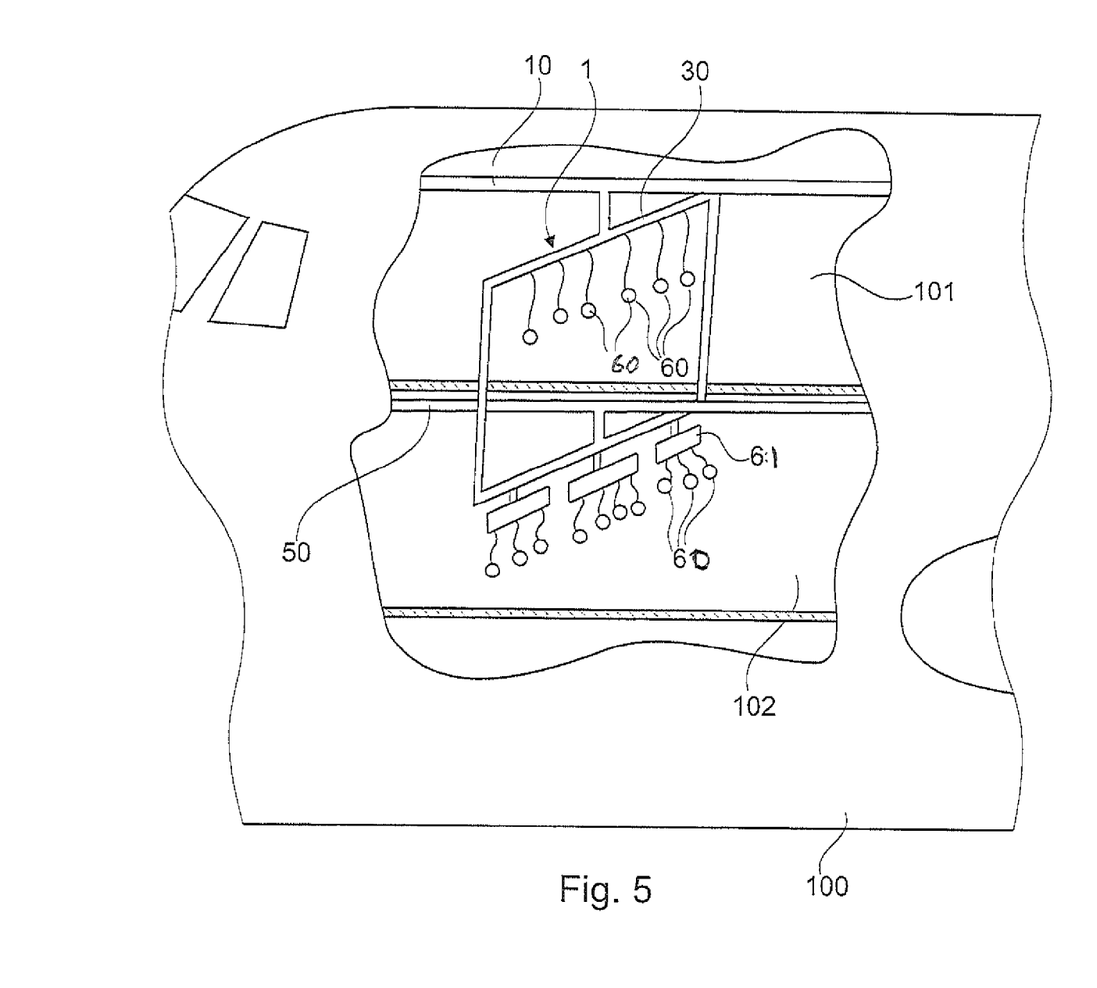
FIG. 5 shows an aircraft according to an exemplary embodiment of the invention.

FIG. 5 shows an aircraft according to an exemplary embodiment of the invention, comprising a gas supply system or an oxygen supply system. In the embodiment shown in FIG. 5, the aircraft 100 comprises a first passenger cabin region 101 and a second passenger cabin region 102. In this arrangement the main supply line 10 can be situated in the ceiling region of the first passenger cabin region 101, while the second main supply line 50 is situated in the ceiling region of the second passenger cabin region 102. As an alternative, a main supply line can also be provided underneath the second passenger cabin region 102. Of course, it is also possible to provide more than two main supply lines, for example a third main supply line (not shown) in addition to the main supply lines 10, 50 shown in FIG. 5, for example in the floor region of the lower passenger cabin region 102. In the embodiment shown, the group supply line is ring-shaped; however it can also be a branched group supply line system in the form of a tree structure or branch structure. Of course, a group supply line can also be provided in the form of a loop-line system, in particular where more than two main supply lines are provided. The loops or branches of the loops can then also comprise flow monitoring devices and nonreturn valves in order to carry out decoupling of defective trains of pipes. In the region of the upper passenger cabin region 101, FIG. 5 shows an embodiment in which the consumers are individual gas masks or oxygen masks 61. In the region of the lower passenger cabin region 102 an alternative embodiment is shown, in which the consumers 60 are groups of oxygen masks or gas masks 61 which can, for example, be connected to oxygen containers in the hatracks.

It should be noted that no valve devices or shut-off devices are shown in FIG. 5, but that these can, of course, be provided as shown, for example, in the embodiment according to FIG. 3.

Of course, it is also possible to provide shut-off devices and monitoring devices within the main supply line, for example in order to shut-off or open sections of a main supply line. The main supply lines 10 or 50 can, of course, also be interconnected by bypass lines, for example in order to make it possible, in the case of a failure of certain regions, to make a detour around the damaged region.

It should be mentioned that the present invention, apart from its use in aircraft, can also be used, for example, in other vehicles, for example in the case of an oxygen supply in buses or aircraft when these operate, for example, in regions in which the ambient air may not without further ado be able to be used for being supplied to passengers. The gas supply system can, of course, also be used in other gas supply systems, for example those relating to pneumatic circuits. When the gas supply system is modified accordingly, it can, of course, also be used for liquids, for example in hydraulic systems that are to be designed so as to be redundant, for example in braking systems or rudder control systems.

It should be mentioned that the term "comprising" does not exclude further elements; likewise the term "a" or "an" does not exclude several elements and steps.

Reference characters used only serve to provide a better understanding, and should in no way be considered as being limiting in any way, wherein the protective scope of the invention is reflected by the claims.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A gas supply system for an aircraft comprising:
   a first main line;
   a second main line;
   a plurality of ring-shaped group supply lines connected to at least one consumer each;
   a plurality of first connecting lines connecting the first main line to each of the plurality of group supply lines;
   a plurality of second connecting lines connecting the second main line to each of the plurality of group supply lines;
   a flow monitoring device provided between at least one of the group supply lines and one of the first main line and the second main line and configured to limit the flow if the flow exceeds a threshold value and to selectively fluidically separate the one of the first main line and the second main line from said at least one of the group supply lines in case of a leakage in said at least one of the group supply lines connected thereto; and
   a nonreturn valve device provided between at least one of the group supply lines and one of the first main line and the second main line and configured to permit a gas supply flow essentially only in one direction from the one of the first main line and the second main line to said at least one of the group supply lines and to selectively fluidically separate the one of the first main line and the second main line from said at least one of the group supply lines in case of a leakage in the one of the first main line and the second main line.

2. The gas supply system of claim 1, wherein the threshold value is greater than a maximum nominal consumption of all consumers that are connected to the group supply line, and the flow is essentially limited to zero after the flow exceeds the threshold value.

3. The gas supply system of claim 1, further comprising a second flow monitoring device, wherein the second flow monitoring device is provided between at least one of the group supply lines and a consumer, which second flow monitoring device is configured to limit the flow after the flow exceeds a threshold value, wherein the threshold value is greater than the value of the maximum nominal consumption of the consumer, and the flow is limited essentially to zero after the flow exceeds the threshold value.

4. The gas supply system of claim 1, wherein the flow monitoring device comprises a spring valve, and wherein the threshold value is predeterminable by dimensioning the spring.

5. The gas supply system of claim 1, wherein at least one of the flow monitoring device and the nonreturn valve device comprises a valve, a pressure ratio determination device for determining the pressure ratio of a pressure upstream and downstream of the valve, and a valve control device, wherein the valve control device is configured to control the valve based on the pressure ratio determined.

6. The gas supply system of claim 1, further comprising a central monitoring device, wherein the central monitoring device is configured to actuate a group of valves on the basis of at least one of valve positions and pressures in the gas supply system.

7. The gas supply system of claim 1, wherein the gas supply system is an oxygen supply system.

8. The gas supply system of claim 1, wherein the consumer is a gas- or oxygen mask or a group of gas- or oxygen masks for a plurality of passengers.

9. The gas supply system of claim 1, wherein the nonreturn valve device comprises a valve, a pressure ratio determination device for determining the pressure ratio of a pressure upstream and downstream of the valve, and a valve control device, wherein the valve control device is configured to control the valve based on the pressure ratio determined.

10. The gas supply system of claim 1, wherein the consumer is at least one oxygen mask for a passenger.

11. An aircraft comprising a gas supply system, the gas supply system comprising:
    a first main line;
    a second main line;
    a plurality of ring-shaped group supply lines connected to at least one consumer each;
    a plurality of first connecting lines connecting the first main line to each of the plurality of group supply lines;
    a plurality of second connecting lines connecting the second main line to each of the plurality of group supply lines;
    a flow monitoring device provided between at least one of the group supply lines and one of the first main line and the second main line and configured to limit the flow if the flow exceeds a threshold value and to selectively fluidically separate the one of the first main line and the second main line from said at least one of the group supply lines in case of a leakage in said at least one of the group supply lines connected thereto; and a nonreturn valve device provided between at least one of the group supply lines and one of the first main line and the second main line and configured to permit a gas supply flow essentially only in one direction from the one of the first main line and the second main line to said at least one of the group supply lines and to selectively fluidically separate the one of the first main line and the second main line from said at least one of the group supply lines in case of a leakage in the one of the first main line and the second main line.

12. The aircraft of claim 11, wherein the first main line is arranged above a passenger cabin region and the second main line is arranged below the passenger cabin region.

13. An aircraft according to claim 11, wherein the gas supply system is arranged in a region of the aircraft designated as a region into which, in the case of a malfunction, parts that have become detached from power plants can penetrate.

\* \* \* \* \*